July 30, 1940.  E. VOLLENWEIDER  2,209,588
INTERMITTENT FILM FEED FOR MOTION PICTURE PROJECTORS
Original Filed March 15, 1937  2 Sheets-Sheet 2
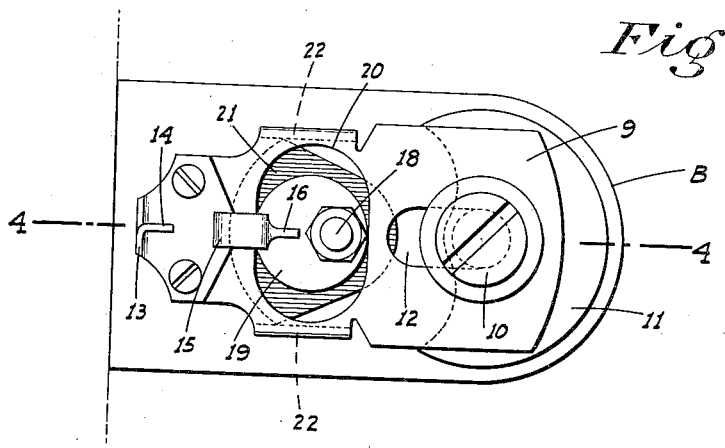
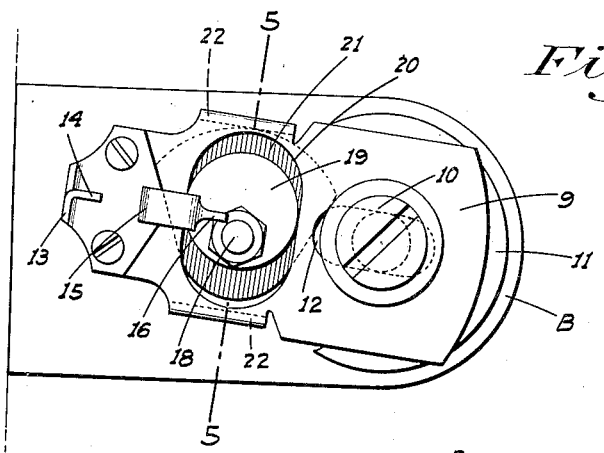
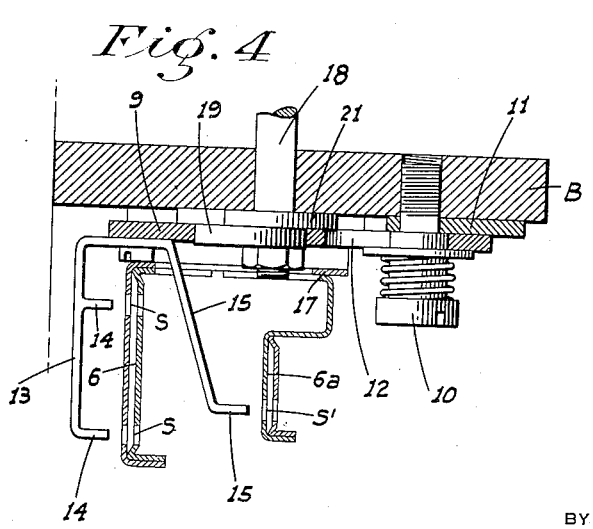
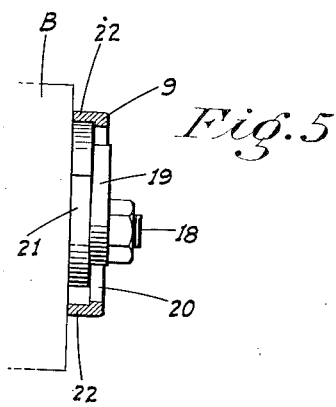
INVENTOR
Emil Vollenweider
BY
ATTORNEY Patented July 30, 1940

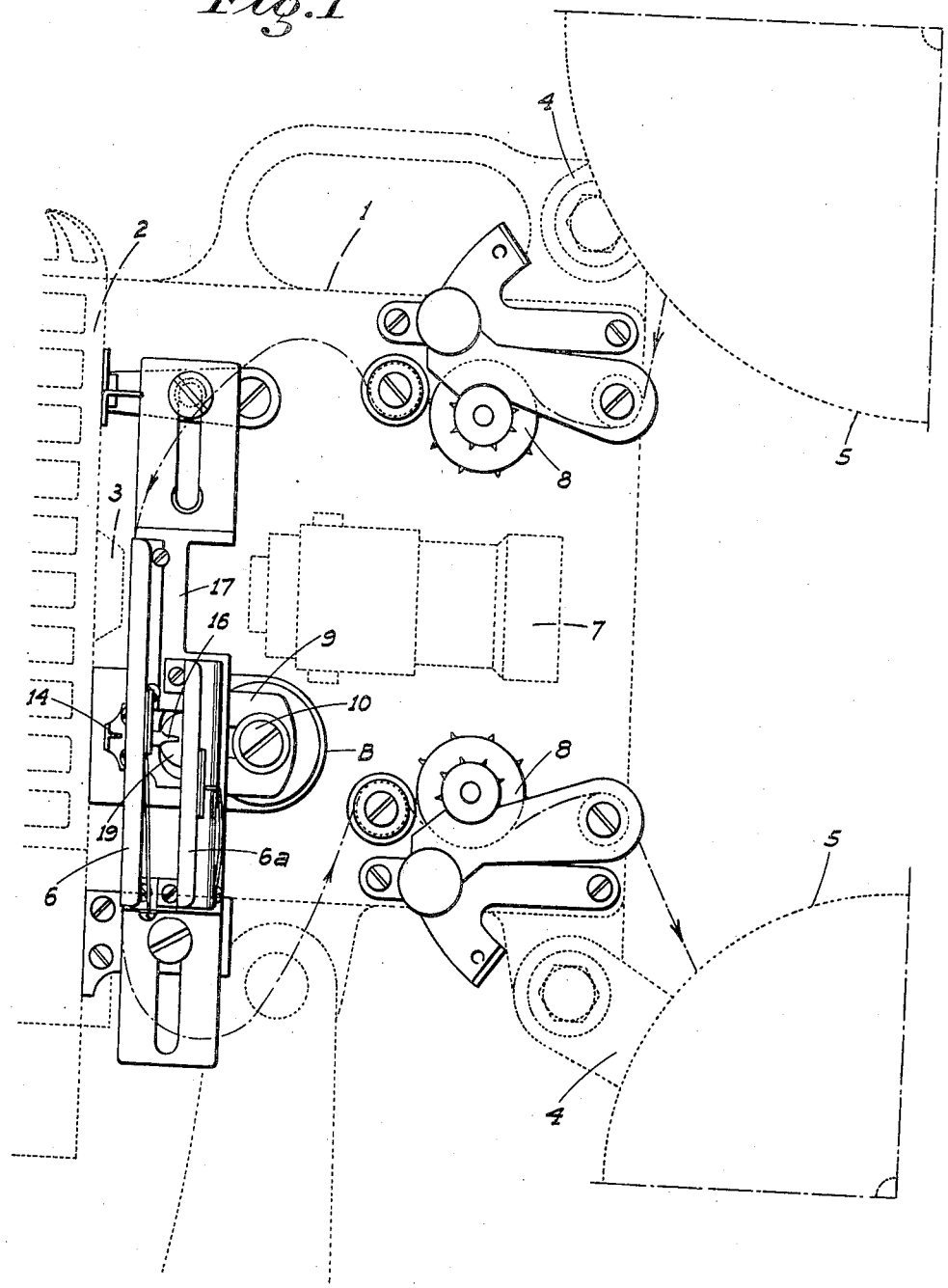

2,209,588

UNITED STATES PATENT OFFICE 2,209,588

INTERMITTENT FILM FEED FOR MOTION PICTURE PROJECTORS

Emil Vollenweider, Sacramento, Calif.

Original application March 15, 1937, Serial No. 131,030. Divided and this application September 28, 1937, Serial No. 166,095

1 Claim. (Cl. 88—18.4)

This invention relates generally to a motion picture projector; the invention being directed particularly to an intermittent film feed mechanism. The present application is a division of my copending application for U. S. patent on Motion picture projector, Serial No. 131,030, filed March 15, 1937.

The principal object of this invention is to provide an intermittent film feed or shuttle mechanism for motion picture projectors and which mechanism is arranged to feed the film through the film gate at proper speed without distortion or buckling and without undue wear on the film as now occurs in some projectors— particularly those intended for home use or the like and which projectors usually are constructed to receive a relatively narrow film.

Another object of my invention is to provide an intermittent film feed mechanism which is so designed that it is readily adaptable for use in connection with motion picture projectors of the "double projection" type; that is, a projector in which either 8 mm. or 16 mm. film may be used selectively. A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 1 is a fragmentary side outline of a motion picture projector illustrating generally the position of the intermittent film feed or shuttle mechanism on the projector and relative to the film gate.

Figure 2 is an enlarged side elevation of the shuttle mechanism with the film claws in retracted position.

Figure 3 is a similar view but with the film claws raised but not materially advanced.

Figure 4 is an enlarged sectional plan view of the shuttle mechanism shown in connection with the film gate, and taken on line 4—4 of Fig. 2.

Figure 5 is an enlarged cross section on line 5—5 of Fig. 3.

Referring now more particularly to the characters of reference on the drawings, the projector upon which my improved intermittent film feed mechanism is shown in the present instance comprises a body 1 having a ventilated casing 2 projecting laterally from one side and enclosing the usual source of light and provided with a condenser lens 3. Arms 4 are mounted on and diverge forwardly from the body and at their outer ends carry the spindles for removable film supply and take-up reels 5 driven in the usual manner. An adjustable dual film gate unit comprising a vertical 16 mm. gate and a parallel 8 mm. gate 6a disposed ahead thereof, is mounted on and projects laterally from the side of the body between the condenser lens 3 and a projecting lens 7 mounted on the side of the body some distance ahead of the lens 3. Upper and lower film feed sprockets 8 are mounted on the side of the body in the usual position, such sprockets being duplicates, the lower one being disposed in an inverted position relative to the upper sprocket. The dual film gate is constructed according to the disclosure thereof in the above identified copending application Serial No. 131,030 while the sprocket film feed is constructed in the manner shown and described in my copending divisional application for patent entitled Sprocket film feed for motion picture projectors, Serial No. 166,096, filed September 28, 1937.

The intermittent film feed or shuttle mechanism which is the subject matter to which the present application is particularly directed comprises the following:

A shuttle arm 9 is pivoted on a spring tension bolt 10 threaded into a supporting block B disposed against one side of body 1, a spacing washer 11 maintaining the arm free from the block for pivotal movement. The arm 9 is horizontally slotted as at 12 in order that said arm may not only swing about the bolt as an axis but may also slide radially relative thereto. The arm 9 extends rearwardly from bolt 10 alongside the film gates 6 and 6a and is formed at its rear end with a laterally projecting finger 13 having spaced forwardly extending film engaging claws 14. This finger 13 is disposed to the rear of the film gate 6 and the claws 14 extend through vertical slots S in the back of film gate 6 whereby the claws may project therethrough and engage in the usual openings in the 16 mm. film in said gate. Another finger 15 projects laterally from the shuttle arm 9 intermediate the two film gates, this finger being provided with a film engaging claw 16 which is arranged to engage the 8 mm. film in gate 6a through vertical slot $S^1$. The supporting plate 17 for the film gates is also vertically slotted to permit of unrestricted up and down motion of the finger 15. As the claw 16 is disposed closer to the pivotal axis of arm 9 than claws 14, claw 16 will move a lesser distance than claws 14. Thus, by proper spacing of the claws the same intermittent film feed or shuttle mechanism may be used for both 16 mm. and 8 mm. film, the latter of course requiring less movement per frame.

A shaft 18, driven and properly timed as usual, extends through block B and a circular cam 19 is eccentrically mounted on the end thereof, said cam riding in and engaging the wall of a vertically disposed oblong slot 20 cut through shuttle arm 9. Another eccentric cam 21, of substantially triangular configuration is mounted on shaft 18 and engages with inturned flanges 22 on the upper and lower edges of the shuttle arm 9.

The cams 19 and 21 are so arranged that, with the rotation of the shaft 18, the shuttle arm 9 will be moved so that the claws 14 and 16 will alternately travel in a true vertical plane and then in a true horizontal plane; the claws on the upward stroke being retracted and free of the film and advanced in a film engaging and moving position on the downward stroke. Each alternate rectilinear motion of the claws in both vertical and horizontal plane is accomplished only by an exacting balance between the cams, the circular cam functioning to compensate for the arcuate motion which would otherwise be imparted to the claws 14 and 16 as the triangular cam raises or lowers arm 9, while the triangular cam functions to compensate for the deflection from a horizontal plane which would otherwise occur as the circular cam advances or retracts the claws.

As the claws 14 and 16 move with a rectilinear motion both vertically and horizontally, they move the film down through the film gates without distortion of buckling and they also retract from or advance into the film without binding. My improved shuttle mechanism affords an effective and silent means to impart intermittent movement to the film smoothly and without wear on the same.

From the foregoing description it will be readily seen that I have produced such a device as substantially fulfills the objects of the invention as set forth herein.

While this specification sets forth in detail the present and preferred construction of the device, still in practice such deviations from such details may be resorted to as do not form a departure from the spirit of the invention, as defined by the appended claim.

Having thus described my invention, what I claim as new and useful and desire to secure by Letters Patent is:

In a motion picture projector having a condenser lens and a pair of film gates for different sized films spaced ahead of the lens, the gate farthest from the lens being adapted to receive the smallest film, a shuttle arm projecting ahead of the gates, film engaging claws on the arm spaced according to the spacing of the gates and adapted to engage film therein, means pivotally mounting the arm at a point ahead of the claws for oscillating movement in a vertical plane whereby with movement of the arm through a predetermined number of degrees the claws will move through paths of different lengths, and means to actuate the arm.

EMIL VOLLENWEIDER.